（12）United States Patent
Lewis

(10) Patent No.: US 6,631,033 B1
(45) Date of Patent: Oct. 7, 2003

(54) MULTILAYER OPTICAL FILTERS

(75) Inventor: Keith L Lewis, Malvern (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 09/890,142

(22) PCT Filed: Jan. 27, 2000

(86) PCT No.: PCT/GB00/00209

§ 371 (c)(1),
(2), (4) Date: Jan. 15, 2002

(87) PCT Pub. No.: WO00/45201

PCT Pub. Date: Aug. 3, 2000

(30) Foreign Application Priority Data

Jan. 29, 1999 (GB) ............................................ 9901858

(51) Int. Cl.$^7$ ................................................. G02B 5/28
(52) U.S. Cl. .................. 359/584; 359/580; 359/585; 359/588; 359/589; 359/590; 359/900; 428/916
(58) Field of Search ................ 359/588, 590, 359/900, 580, 584, 585, 589

(56) References Cited

U.S. PATENT DOCUMENTS 4,169,655 A * 10/1979 Jacobsson ................ 359/360
4,756,602 A * 7/1988 Southwell et al. .......... 359/588
4,837,061 A * 6/1989 Smits et al. ................ 428/41.1
5,926,317 A * 7/1999 Cushing ...................... 359/588

FOREIGN PATENT DOCUMENTS

| EP | 0 902 305 | 3/1999 |
| GB | 2 070 275 | 9/1981 |
| WO | 95/30972 | 11/1995 |
| WO | WO97/01777 | 1/1997 |

OTHER PUBLICATIONS

Macleod H A: "Thin–Film Optical Filters" 1986, GB, Bristol, Adam Hilger, pp. 270–276.
Patent Abstracts of Japan vol. 007, No. 067 (P–184), Mar. 1983 & JP 57 212403 (Canon KK), Dec. 1982.

* cited by examiner

Primary Examiner—John Juba
(74) Attorney, Agent, or Firm—Nixon & Vanderhye P.C.

(57) ABSTRACT

Optical filters (1) designed in pairs, which are essentially colourless in their individual general appearance designed to take on a strong coloration when viewed together in transmission, said filters being particularly, useful for identification of counterfeit articles. The optical filters (1) utilize resonantly-coupled Fabry-Perot etalons of, an asymmetric design. The filters (1) are configured such that one of the Fabry-Perot cavities within the filter incorporates an additional multiple quarter wave thickness layer (20), said additional layer having a contrasting refractive index to that of the cavity spacer.

22 Claims, 6 Drawing Sheets

Figure 1:
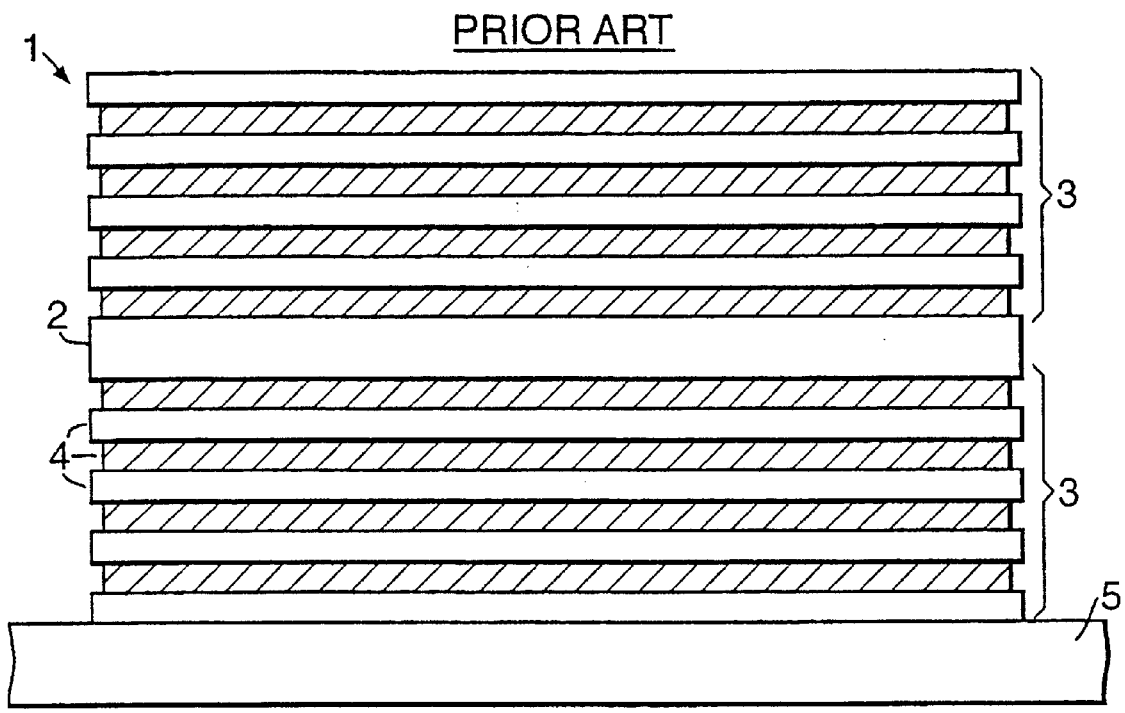

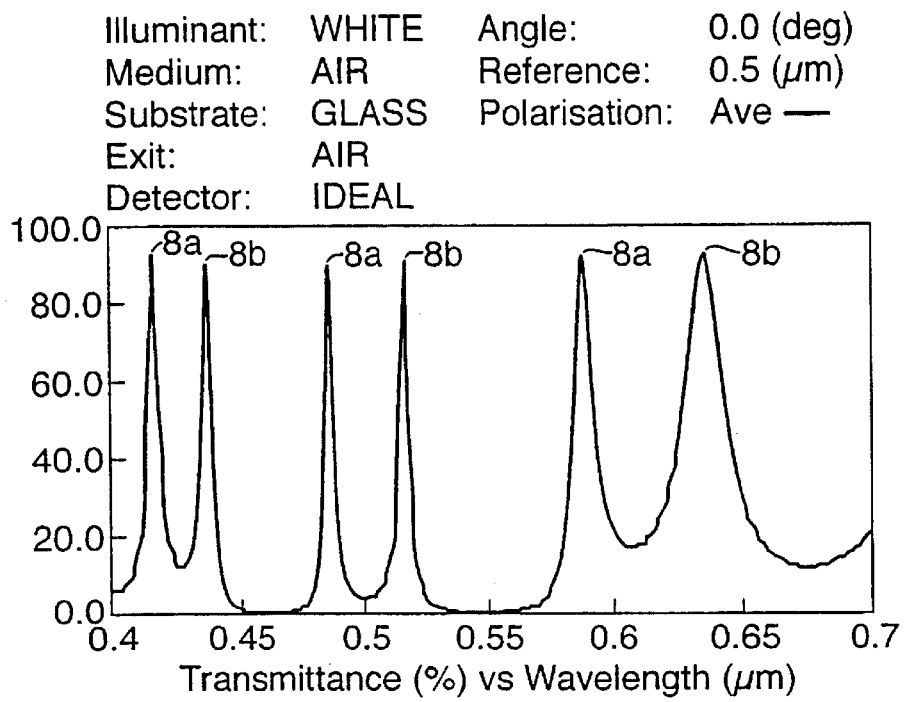
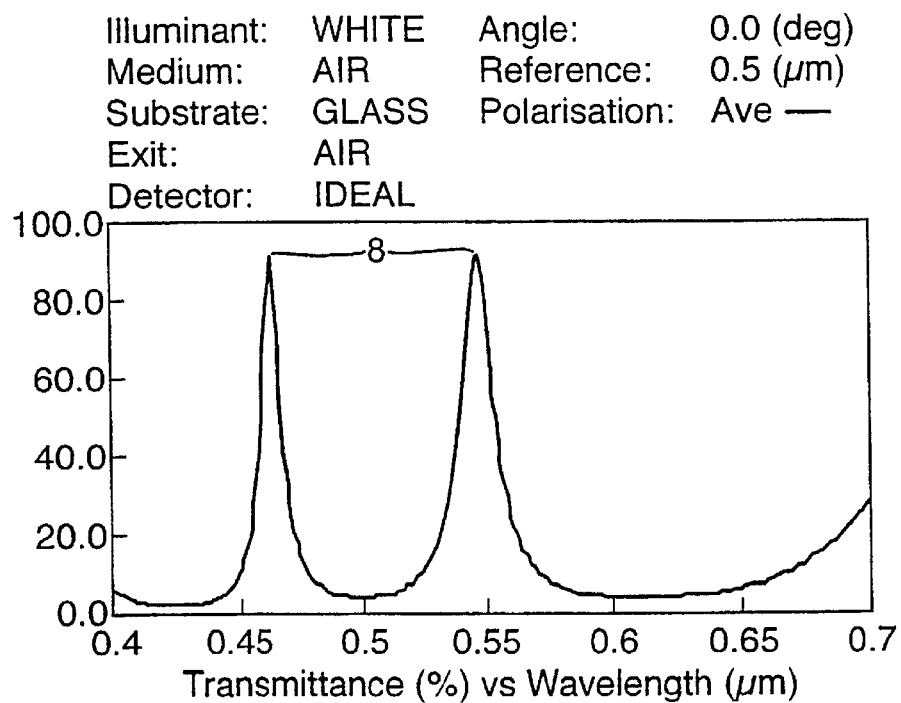

| Illuminant: | WHITE | Angle: | 0.0 (deg) |
| --- | --- | --- | --- |
| Medium: | AIR | Reference: | 0.5 ($\mu$m) |
| Substrate: | GLASS | Polarisation: | Ave — |
| Exit: | AIR | | |
| Detector: | IDEAL | | |

Transmittance (%) vs Wavelength ($\mu$m)

MULTILAYER OPTICAL FILTERS

This application is the U.S. national phase of International Application No. PCT/GB00/00209, filed Jan. 27, 2000, which designated the U.S., the entire content of which is hereby incorporated by reference.

This invention relates to the covert identification of genuine and counterfeit articles and has particular (but not exclusive) relevance to the retail trades.

UK patent no. 2302308 discloses a technique for protecting articles using a covert labelling system, which can be verified by ostensibly covert means. The technique relies on the incorporation of an optical filter on the article (or its packaging), which is then verified or authenticated by observation using a second filter. Typically, the transmittance versus wavelength characteristic of each of the optical filters exhibits at least one peak or trough. The design of the second filter is such that it is complementary to the first and the combination produces an optical effect that is absent in either of the two individual filters.

UK patent no. 2302308 describes a variety of optical filters suitable for use with the above technique including conventional thin film filters based on Fabry-Perot etalons or distributed Bragg reflectors. The structures of these devices are well known to those skilled in the art; see for example, U.S. Pat. No. 4,756,602, which discusses a conventional all-dielectric Fabry-Perot etalon design.

The optical characteristics of the filters may be enhanced by employing more complex filter structures, for example using filters based on coupled Fabry-Perot etalons or multiple cavity Fabry Perot etalons. Again, the structures of such devices are well known to those skilled in the art.

For example, U.S. Pat. No. 4,756,602 extends the idea of a single all dielectric Fabry-Perot etalon to disclose a narrow band-pass filter, exhibiting a single transmission peak, based on a conventional coupled cavity Fabry-Perot etalon. Similarly, U.S. Pat. No. 5,410,431 discusses a staggered coupled cavity design suitable for use in the above technique, whilst UK patent GB 1306335 describes another potential filter configuration using a multiple Fabry-Perot etalon design.

UK patent GB2302308 suggests other interesting optical effects are possible using the aforementioned technique, for example modulating the reflection characteristics of the label as a function of angular viewing position. GB 1270042 discloses a multilayer bandpass filter which ensures that the pass-band exists only for a single angle of incidence.

Other examples described in UK 2302308 are based on high transmission comb filters which can provide an essentially neutral spectral characteristic. However, the total thickness of material required for the above filters can be as much as $10 \times 10^{-6}$ m, which would place a significant obstacle to their realisation using standard industrial production techniques. Also, the effective range of wavelengths over which simple all-dielectric Fabry-Perot filters operate is somewhat limited by unwanted sidebands of transmission which appear on either side of the peak in the passband. Referring to the transmission versus wavelength characteristic for a particular filter, the range of wavelengths bounded by the unwanted sidebands governs the practical operating range of the filter. This range is defined as the locus of minimum transmission and varies from filter to filter according to the filter configuration. The narrow loci of minimum transmission exhibited by the above filters has the effect of reducing the range of wavelengths over which the filters can be used in practice.

In addition, the net integrated photopic transmission of the aforementioned filters is often low, reducing the brightness of the optical effect produced by the technique and restricting the range of colour effects achievable.

The present invention relates to an improved optical filter design for use in the covert identification of genuine and counterfeit articles. It has particular relevance to the retail trades where it offers an alternative to the known optical filters used in conventional anticounterfeiting techniques. A significant advantage of the design is that the optical filter exhibits a total film thickness of less than $10^{-6}$ m, thereby improving industrial production techniques compared to conventional filters. In addition, the optical filter exhibits a broad locus of minimum transmission, enabling operation over a wide range of wavelengths.

The net integrated photopic transmission of the filter is high, increasing the range of colour effects available and producing a bright optical effect which is easily perceived by the unaided eye.

According to the present invention, an optical filter comprises a resonantly coupled Fabry-Perot etalon, having at least two component cavities, wherein each component cavity comprises one set of multiple half wave spacer layers between two partially reflecting mirrors,
characterised by the addition of a single layer of multiple quarter wave thickness to one of the cavities, said additional layer having a contrasting refractive index to that of the spacer.

Preferably the partially reflecting mirrors comprise thin metallic layers or quarter wave stacks of dielectric materials.

In a preferred embodiment the locus of minimum transmission extends over substantially the whole of the visible part of the electromagnetic spectrum.

In particular, the locus of minimum transmission extends over the range of wavelengths 400 nm–700 nm.

In a further preferred embodiment the transmittance versus wavelength characteristic contains at least one pass band in the near infrared region of the electromagnetic spectrum.

Preferably the net integrated photopic transmission of the filter exceeds 25%.

In a second aspect of the present invention, a method of marking an article so that its authenticity can be determined when viewed through a first optical filter means comprising an optical filter according to the above description, comprises the step of incorporating into the article or its packaging, a second optical filter means comprising an optical filter according to the above description, wherein the second optical filter means is adapted such that when viewed through the first optical filter means a strong change in colouration is observed.

Preferably the optical filter means are arranged to be essentially colourless in their individual general appearance but to take on a strong colouration when viewed together in transmission.

In a preferred embodiment the transmittance versus wavelength characteristics of the first and second optical filter means are arranged to be substantially complementary, such that the second optical filter means appears essentially black when viewed through the first optical filter means.

In a further preferred embodiment the transmittance versus wavelength characteristics of the first and second optical filter means are arranged to be substantially similar at selected wavelengths such that the second optical filter means exhibits a strong change in colour hue when viewed through the first optical filter means.

The second optical filter means may be incorporated into a paint or a label which is applied to the article or its packaging.

In another embodiment the second optical filter means is deposited on a polymer film which is subsequently applied to the article, to its packaging or to a label attached to the article or its packaging.

At least one of the optical filter means may be derived from a plurality of optical filters, the filters being deposited on layers of polymer film which are subsequently laminated together to produce the optical filter means.

In one preferred arrangement both the first and the second optical filter means are applied to the article, its packaging or a label attached to the article or its packaging.

The first optical filter means may be incorporated into a pair of spectacles.

Figure 2:
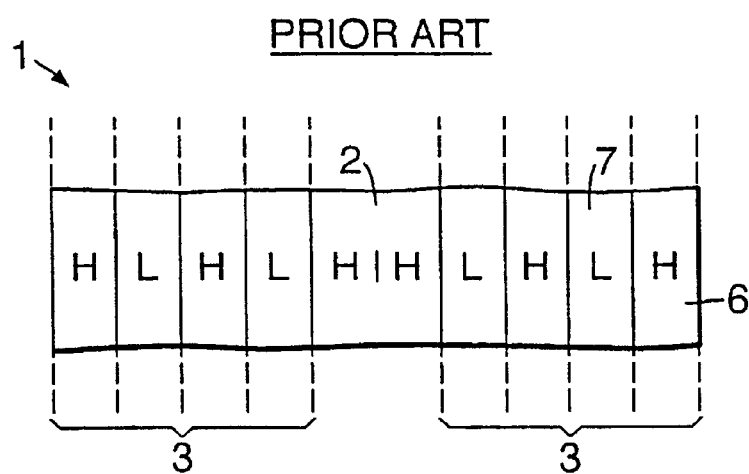
Figure 3:
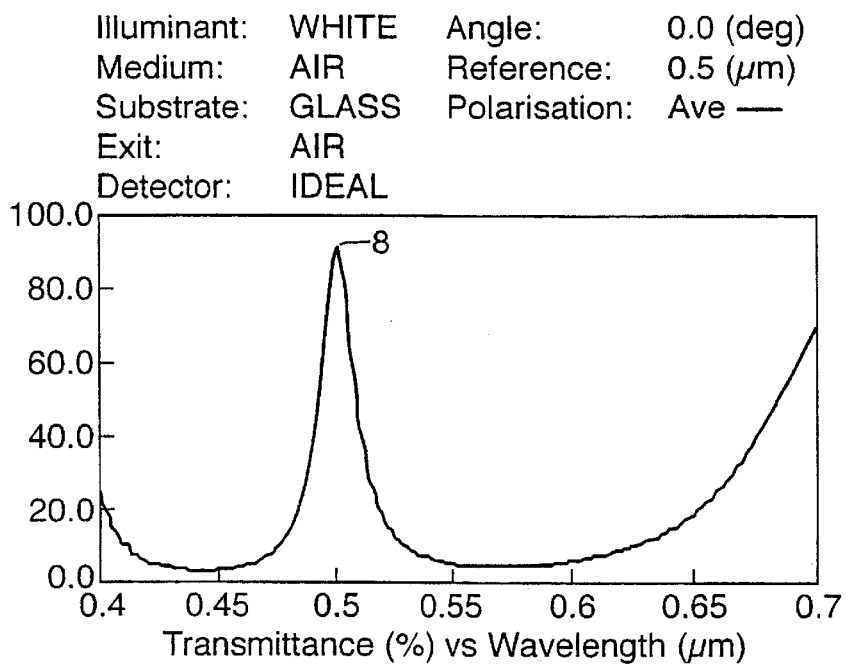
Figure 4:
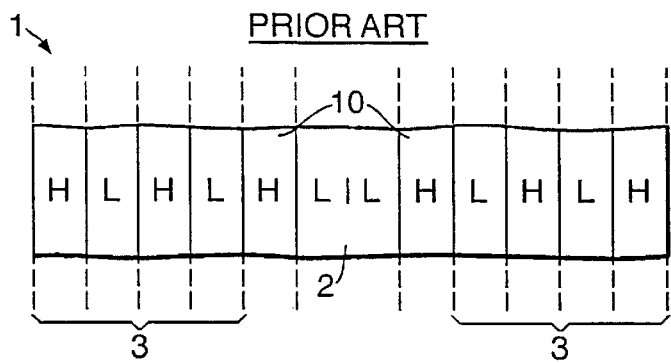
Figure 5:
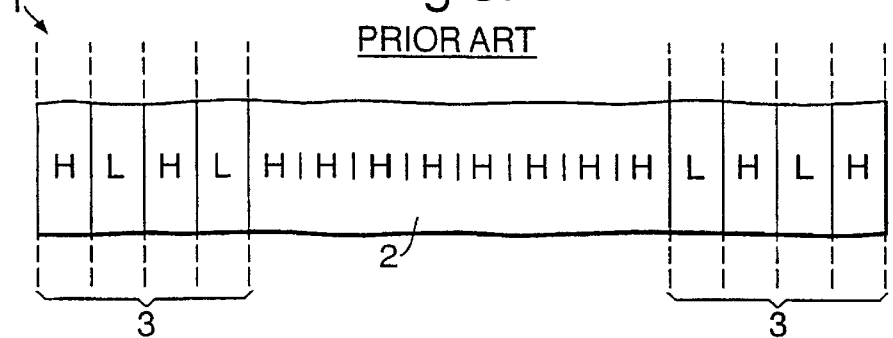
Figure 6:
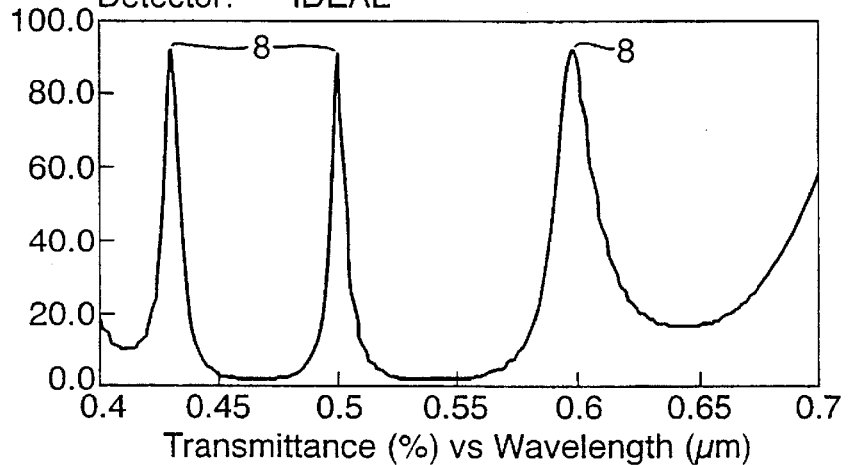
Figure 7:
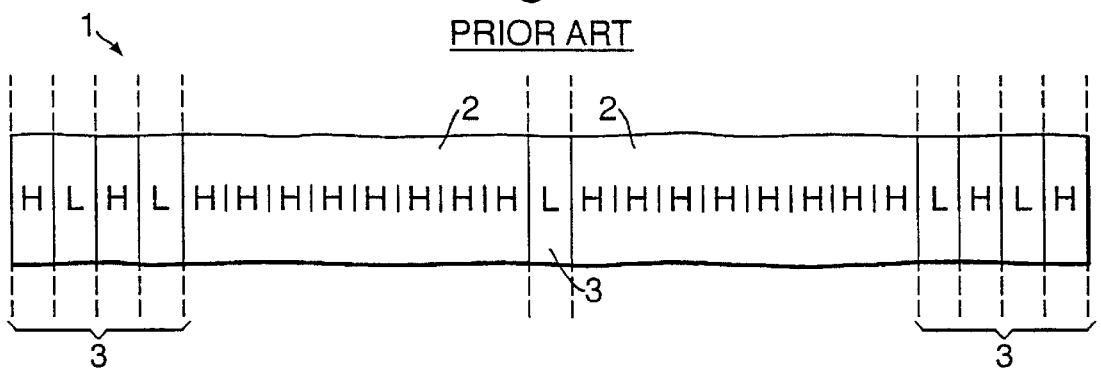
Figure 9:
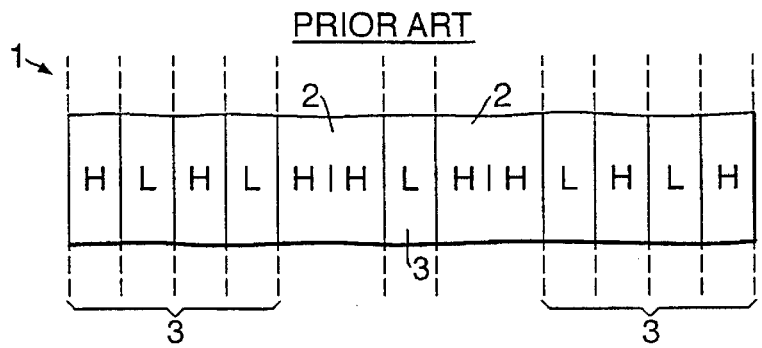
Figure 11:
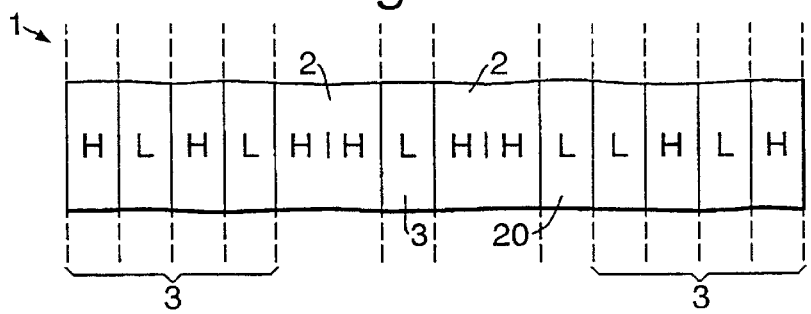
Figure 12:
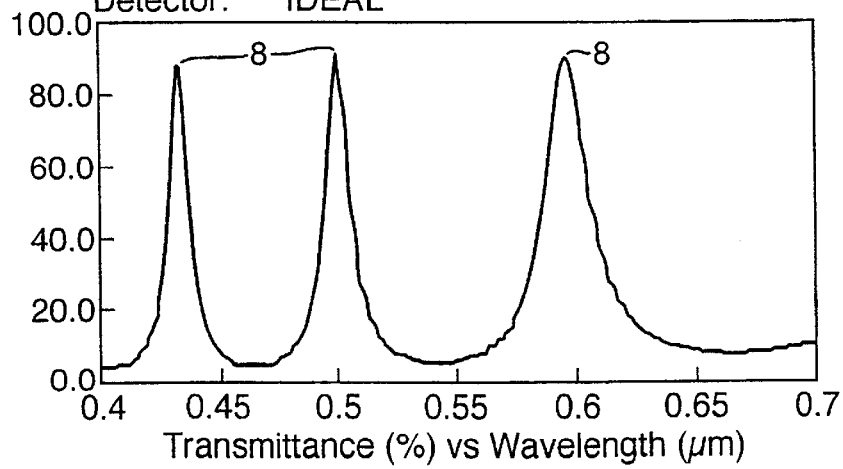
Figure 13:
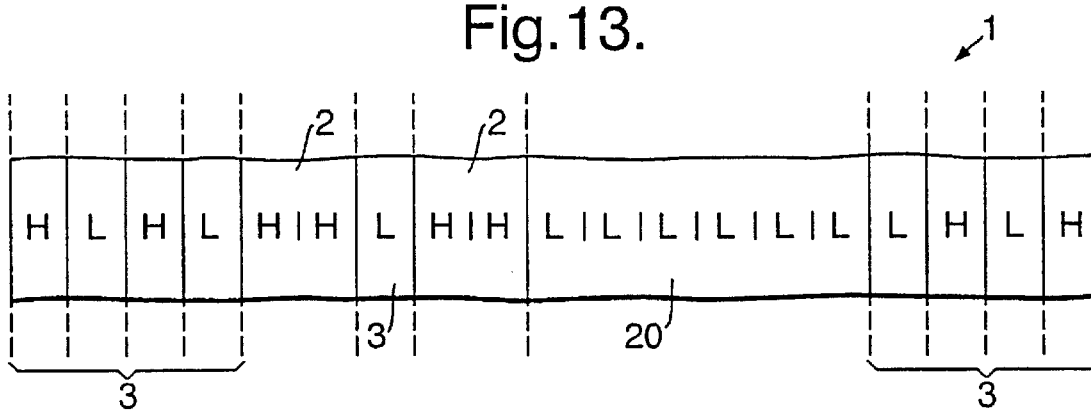
Figure 14:
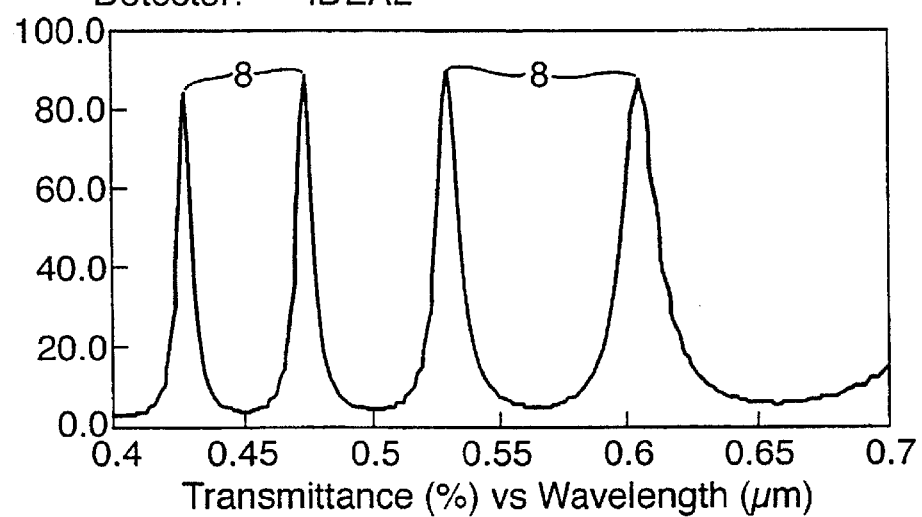

The invention will now be described, by example only, with reference to the following figures in which:

FIG. 1 illustrates the schematic structure of a conventional all-dielectric Fabry-Perot filter known in the prior art, FIG. 2 illustrates the schematic structure of a conventional Fabry-Perot etalon of the form (HL)^2 HH (LH)^2 known in the prior art, FIG. 3 illustrates the spectral characteristics of a conventional Fabry-Perot etalon of the type illustrated in FIG. 2, fabricated using $TiO_2$ and $SiO_2$, and exhibiting a pass-band centred at $0.5 \times 10^{-6}$ m, FIG. 4 is a schematic illustration of a conventional Fabry-Perot etalon of the design (HL)^2 H 2L H (LH)^2, known in the prior art, employing a low index spacer layer, FIG. 5 is a schematic illustration of a conventional higher order filter, known in the prior art, based on a (HL)^2 8H (LH)^2 stack, FIG. 6 shows the spectral characteristics of a higher order filter based on a (HL)^2 8H (LH)^2 stack, FIG. 7 is a schematic illustration of a close-coupled cavity filter of the design (HL)^2 8H L 8H (LH)^2 known in the prior art, FIG. 8 shows the spectral characteristics of a coupled cavity design, based on a (HL)^2 8H L 8H (LH)^2 stack, FIG. 9 is a schematic illustration of a conventional (HL)^2 2H L 2H (LH)^2 coupled cavity design known in the prior art, FIG. 10 shows the optical transmission characteristic of the (HL)^2 2H L 2H (LH)^2 coupled cavity design, FIG. 11 is a schematic illustration of the filter of FIG. 9, modified by the addition of a single low index layer to give (HL)^2 2H L 2H L (LH)^2, FIG. 12 shows the optical transmission characteristic of the modified filter of the form (HL)^2 2H L 2H L (LH)^2, FIG. 13 is a schematic illustration of a filter design based on (HL)^2 2H L 2H 6L (LH)^2, wherein the low index layer has been increased to six quarter waves, FIG. 14 shows the optical transmission of the filter design based on (HL)^2 2H L 2H 6L (LH)^2.

An optical filter with a single pass band may be realised using a Fabry-Perot etalon (alternatively referred to as a Fabry-Perot cavity). Referring to FIG. 1, in its most basic form the optical filter (1) comprises a dielectric spacer layer (2) incorporated between two partially reflecting mirrors (3), arranged so that processes of constructive and destructive interference can occur. When there are no optical losses in the system, the device is transparent only at its resonant wavelength, determined by the thickness of the spacer layer (2), which is a multiple halfwave in thickness. The partially reflecting mirrors can be realised using thin layers of metal, for example silver or aluminium, or from quarter wave stacks of dielectric materials.

For the purposes of this application, the term partially reflecting mirror shall be taken to be any partially reflecting surface whether it be formed from a thin layer of metal such as aluminium or silver, or from quarter wave stacks of dielectric materials.

In the case of an all-dielectric Fabry-Perot etalon, the partially reflecting mirrors (3) comprise stacks of quarter wave layers of dielectric material (4). The dielectric material is deposited upon a filter substrate (5) which may be glass or any other suitable material. The filter may be fabricated using a wide variety of compounds including oxides, nitrides, sulphides, and fluorides, such structures and materials being well known to those skilled in the art.

A Fabry-Perot etalon based on the latter concept using $TiO_2$ and $SiO_2$ is shown schematically in FIG. 2. The filter design shown in FIG. 2 is denoted by (HL)^2 HH (LH)^2, where H and L represent quarter wave thicknesses of materials of high refractive index (6) and low refractive index (7) respectively. The spectral characteristic of the above Fabry-Perot etalon is centred at the design wavelength of $0.5 \times 10^{-6}$ m as shown in FIG. 3.

In this particular configuration the half wave spacer layer (2) comprises high refractive index dielectric material. The cavity finesse is deliberately chosen to be quite small in this example, which results in a full width half maximum (FWHM) bandwidth for the passband of about 17 nm. The cavity finesse is defined as the ratio of the separation of adjacent fringes in the filter passband (8) to the fringe half width (the fringe width measured at half the peak transmission).

It is well known that such filters can also be produced by using a low refractive index material for the spacer layer (2), in which case an additional quarter wave of high index material (10) is added to each dielectric stack to give the resulting design (HL)^2 H 2L H (LH)^2, as shown in FIG. 4.

It is known that the number of passbands (8) can be increased by increasing the thickness of the spacer layer (2). FIG. 5 shows the schematic illustration of a higher order filter incorporating an 8H spacer layer (2). The corresponding spectral characteristics for the higher order filter are illustrated in FIG. 6.

For a more detailed description of the devices, refer to H. A. Macleod, "Thin-Film Optical Filters", Macmillan, $2^{nd}$ edition, 1986.

Unfortunately, the limited locus of minimum transmission of these conventional Fabry-Perot filters restricts the range of wavelengths over which they can be used in practice. Moreover, the locus of minimum transmission is defined largely by the difference in refractive indices of the dielectric materials present in the mirror stacks. Hence, it is quite difficult to increase the width of this minimum simply by changing the mirror stacks without recourse to considerably more complex structures and attendant increased manufacturing cost.

Alternatively, additional pass-bands (8) can be introduced by exploiting resonantly-coupled cavity designs comprising the following basic form reflector|half-wave|reflector|half-wave|reflector.

Filters of this designs are alternatively known as double-half-wave (DHW) filters. Similarly, multiple cavities may be resonantly coupled together in series to form multiple-half-wave filters.

The resonant coupling between the two cavities can be arranged to be relatively short, resulting in the splitting of the cavity resonance. FIG. 7 shows a schematic representation of a close-coupled resonant cavity design of the form (HL)^2 8H L 8H (LH)^2.

The transmission spectrum of the close-coupled design (HL)^2 8H L 8H (LH)^2 is shown in FIG. 8. Each pass band (8) of the single cavity design is now split into two (8a,8b), although the total thickness of the filter is now increased with a corresponding increase in its complexity and additional cost of manufacture.

The present invention enables additional pass bands to be introduced into the filter transmission characteristic, whilst maintaining a relatively simple filter structure, through the use of an asymmetric coupled-cavity design in which one cavity incorporates additional quarter waves of dielectric material (20). The additional layer of dielectric material (20) is a multiple quarter wave in thickness and is of contrasting refractive index to that of the cavity spacer layer (2).

As an example, consider the case of the (HL)^2 2H L 2H (LH)^2 stack shown in FIG. 9. The transmission spectrum of such a design is shown in FIG. 10. When modified by the inclusion of a single low index layer (20) to give (HL)^2 2H L 2H L (LH)^2 (see FIG. 11) the optical transmission is enhanced by the addition of a further pass band (8) as shown in FIG. 12. Significantly the locus of minimum transmission is broadened considerably in comparison with that shown in FIG. 10. Indeed the locus of minimum transmission is extendable to cover wavelengths in the range 400 nm–700 nm, which represents substantially the whole of the visible part of the electromagnetic spectrum. This is an important feature of the design modification of the present invention since optical effects relying on changes in colouration or hue are feasible over a wider range of wavelengths than available with conventional filters. Further pass bands can be added by increasing the thickness of the additional dielectric layer (20) within the cavity. FIG. 13 shows a schematic illustration of a filter design based on (HL)^2 2H L 2H 6L (LH)^2, wherein the additional dielectric layer (20) has been increased to six quarter waves.

The corresponding optical transmission of the filter design based on (HL)^2 2H L 2H 6L (LH)^2 is shown in FIG. 14.

The design wavelength of the filter characteristic shown in FIG. 12 can be shifted to allow an essentially neutral colouration to be achieved in transmission. Similarly, such effects can be produced in the case of filters with four or more pass bands.

The net integrated photopic transmission of an optical filter is determined by the bandwidth of the transmission bands and exceeds 25% for the present design. The high net integrated photopic transmission of the present filter produces a brighter optical effect compared to conventional filters and increases the range of colour effects available.

The total thickness of a filter of the type shown in FIG. 12 is only about $0.95 \times 10^{-6}$ m.

As an example of their use in anticounterfeiting, two variants of the filter are produced, one for incorporating into a transparent label or for attaching to the article itself or its packaging (where the article or its packaging are substantially transparent), and the other for acting as the authenticator. Both filters are essentially colourless in their individual general appearance, but when viewed together in transmission, would take on a strong colouration.

Where the transmittance versus wavelength characteristics of the two filter variants are arranged to be complementary (peaks of one characteristic coincide with the troughs of the other and vice versa), the filter incorporated into the transparent label appears substantially black when viewed through the authenticating filter.

Alternatively, it is possible to arrange the transmittance versus wavelength characteristics of the two filter variants to be similar for specific wavelengths of interest. Selected peaks in the characteristics are tailored to appear at the same wavelengths in both filters. In this case the filter incorporated into the transparent label or attached to the article or its packaging exhibits a strong colour hue when viewed through the authenticating filter.

Specifically for a red colouration, the net effect of the combined filters would be a transmission band between $0.6 \times 10^{-6}$ m and $0.7 \times 10^{-6}$ m. Such an effect would be produced for example by combining the characteristics of the filters in FIGS. 12 and 14.

In comparison for green, the overall transmission band would require positioning between $0.5 \times 10^{-6}$ m and $0.56 \times 10^{-6}$ m. A net blue effect would be produced by a passband between $0.42 \times 10^{-6}$ m and $0.49 \times 10^{-6}$ m.

The enhanced width of the transmission minima in the filters of the present invention is important in providing an adequate degree of freedom in the selection of colour effects achievable.

Whilst the present invention produces an optical effect visible to the unaided eye, its use is not restricted to the visible part of the electromagnetic spectrum. Indeed the principles applied and the effects observed could be exploited, with the aid of suitable detection equipment, outside the visible spectrum. For example, the wide bandwidth of the present invention enables the filter transmission characteristic to be tailored in the near infrared part of the electromagnetic spectrum. Authentication of filters using infrared radiation is therefore possible. The covert nature of the filter is enhanced and authentication is possible by machine rather than with the unaided eye.

The filter to be incorporated into a label may be realised as a paint by incorporation of flakes of filter into a suitable binder for ease of application (for example by spray or screen printing). Alternatively, the filter may be deposited on a polymer film which is then applied to the label. Filters may be laminated together selectively in different combinations to produce different optical effects. This offers a convenient means of continuously varying the characteristics of the complete filters used.

What is claimed is:

1. An optical filter comprising a close coupled resonant Fabry-Perot etalon, having at least two component cavities, wherein each component cavity comprises:
    two partially reflecting mirrors; and
    a spacer layer disposed between said two partially reflecting mirrors wherein said filter further comprises:
        a single layer of substantially multiple quarter wave thickness on one side of only one of the spacer layers, said single layer having a contrasting refractive index to that of the spacer layer, wherein said spacer layers are coupled to induce splitting of the component cavity resonances.

2. An optical filter according to claim 1 wherein the partially reflecting mirrors comprise thin metallic layers.

3. An optical filter according to claim 1 wherein the partially reflecting mirrors comprise substantially quarter wave stacks of dielectric materials.

4. An optical filter according to claim 1, wherein the locus of minimum transmission extends over substantially the whole of the visible part of the electromagnetic spectrum.

5. An optical filter according to claim 1, wherein the locus of minimum transmission extends over the range of wavelengths 400 nm–700 nm.

6. An optical filter according to claim 1, wherein the transmittance versus wavelength characteristic contains at least one pass band in the near infrared region of the electromagnetic spectrum.

7. An optical filter according to claim 1, wherein the net integrated visual photopic transmission of the filter exceeds 15%.

8. A method of marking an article so that its authenticity can be determined when viewed through a first optical device incorporating a first optical filter according to claim 1, comprising the steps of:

incorporating into the article or its packaging, a second optical device incorporating an optical filter according to claim 1, and adapting the second optical device such that, when viewed through the first optical device, a strong change in colouration is observed.

9. A method according to claim 8 wherein the optical devices are arranged to be essentially colourless in their individual general appearance but to take on a strong colouration when viewed together in transmission.

10. A method according to claim 8 or 9 wherein the transmittance versus wavelength characteristics of the first and second optical devices are arranged to be substantially complementary, such that the second optical device appears essentially black when viewed through the first optical device.

11. A method according to claim 8 or 9 wherein the transmittance versus wavelength characteristics of the first and second optical devices are arranged to be substantially similar at selected wavelengths such that the second optical device exhibits a strong change in colour hue when viewed through the first optical device.

12. A method according to claim 8 or 9, wherein the second optical device is incorporated into a label which is applied to the article or its packaging.

13. A method according to claim 8 or 9, wherein the second optical device is incorporated in a paint.

14. A method according to claim 8 or 9, wherein the second optical device is deposited on a polymer film which is subsequently applied to the article, to its packaging or to a label attached to the article or its packaging.

15. A method according to claim 8 or 9, wherein at least one of the optical devices is derived from a plurality of multiple band-pass optical filters, the filters being deposited on layers of polymer film which are subsequently laminated together to produce the optical device.

16. A method according to claim 8 or 9, wherein both the first and the second optical devices are applied to the article, its packaging or a label attached to the article or its packaging.

17. A method according to claim 8 or 9, wherein the first optical device is incorporated into a pair of spectacles.

18. An optical filter comprising a close coupled resonant Fabry-Perot etalon, having at least two component cavities, wherein each component cavity comprises:

two partially reflecting mirrors; and a spacer layer disposed between said two partially reflecting mirrors wherein said filter further comprises:

a single layer of substantially multiple quarter wave thickness on one side of only one of the spacer layers, said single layer having a contrasting refractive index to that of the spacer layer, wherein said spacer layers are coupled to induce splitting of the component cavity resonances, wherein the partially reflecting mirrors comprise thin metallic layers, wherein the transmittance versus wavelength characteristic contains at least one pass band in the near infrared-region of the electromagnetic spectrum.

19. A method of marking an article so that its authenticity can be determined when viewed through a first optical device comprising the steps of:

incorporating into the article or its packaging, a second optical device, said first and second optical devices each incorporating an optical filter comprising:

a close coupled resonant Fabry-Perot etalon, having at least two component cavities, wherein each component cavity comprises:

two partially reflecting mirrors; and a spacer layer disposed between said two partially reflecting mirrors, wherein said filter further comprises a single layer of substantially multiple quarter wave thickness on one side of only one of the spacer layers, said single layer having a contrasting refractive index to that of the spacer layer, wherein said spacer layers are coupled to induce splitting of the component cavity resonances; and adapting the second optical device such that, when viewed through the first optical device, a strong change in colouration is observed.

20. A method according to claim 19 wherein the optical devices are arranged to be essentially colourless in their individual general appearance but to take on a strong colouration when viewed together in transmission.

21. A method according to claim 19 or 20 wherein the transmittance versus wavelength characteristics of the first and second optical devices are arranged to be substantially complementary, such that the second optical device appears essentially black when viewed through the first optical device.

22. A method according to claim 19 or 20 wherein the transmittance versus wavelength characteristics of the first and second optical devices are arranged to be substantially similar at selected wavelengths such that the second optical device exhibits a strong change in colour hue when viewed through the first optical device.

* * * * *

UNITED STATES PATENT AND TRADEMARK OFFICE
CERTIFICATE OF CORRECTION

PATENT NO. : 6,631,033 B1
APPLICATION NO. : 09/890142
DATED : October 7, 2003
INVENTOR(S) : Lewis It is certified that error appears in the above-identified patent and that said Letters Patent is hereby corrected as shown below:

At column 6, line 63, please replace "15%" with --25%--.

Signed and Sealed this

Eighteenth Day of May, 2010

David J. Kappos
*Director of the United States Patent and Trademark Office*